US012572832B2

(12) United States Patent
Klimov

(10) Patent No.: US 12,572,832 B2
(45) Date of Patent: Mar. 10, 2026

(54) BACKTESTING QUANTUM DEVICE CALIBRATION

(71) Applicant: Google LLC, Mountain View, CA (US)

(72) Inventor: Paul Victor Klimov, Santa Barbara, CA (US)

(73) Assignee: GOOGLE LLC, Mountain View, CA (US)

( * ) Notice: Subject to any disclaimer, the term of this patent is extended or adjusted under 35 U.S.C. 154(b) by 569 days.

(21) Appl. No.: 17/988,418

(22) Filed: Nov. 16, 2022

(65) Prior Publication Data

US 2024/0160976 A1 May 16, 2024

(51) Int. Cl.
*G06F 11/30* (2006.01)
*G06N 10/20* (2022.01)

(52) U.S. Cl.
CPC ..................................... *G06N 10/20* (2022.01)

(58) Field of Classification Search
CPC ...................................................... G06N 10/20
See application file for complete search history.

(56) References Cited

U.S. PATENT DOCUMENTS 11,829,844 B2 11/2023 Kilmov et al.
2022/0253740 A1 8/2022 Johnson et al.

OTHER PUBLICATIONS

International Search Report and Written Opinion for Application No. PCT/US2023/079866, mailed Nov. 11, 2024, 19 pages.
Wittler et al., "An Integrated Tool-Set for Control, Calibration and Characterization of Quantum Devices Applied to Superconducting Qubits", arXiv:2009.09866v2, 24 pages.

*Primary Examiner* — Phuong Huynh
(74) *Attorney, Agent, or Firm* — DORITY & MANNING, P.A.

(57) ABSTRACT

An example computer-implemented method for calibrating a qubit of a quantum device is disclosed. The example method includes obtaining a candidate calibration model for calibrating an operating characteristic of the qubit. The example method includes determining, using one or more quantum device models, a simulated quantum device performance metric associated with implementation of the candidate calibration model based on log data descriptive of observed qubit operating characteristics and associated observed quantum device performance metrics.

20 Claims, 12 Drawing Sheets

200

<u>600</u>

602

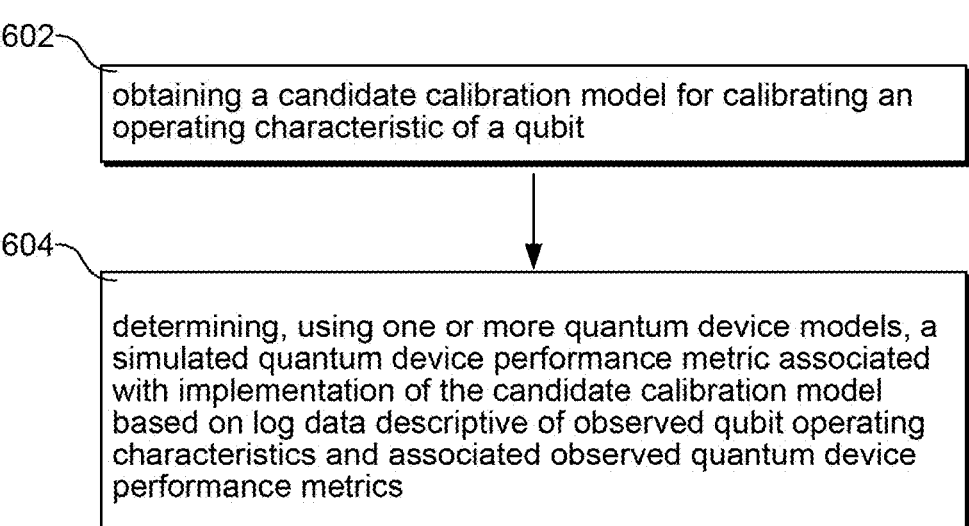

obtaining a candidate calibration model for calibrating an operating characteristic of a qubit

604 determining, using one or more quantum device models, a simulated quantum device performance metric associated with implementation of the candidate calibration model based on log data descriptive of observed qubit operating characteristics and associated observed quantum device performance metrics

Figure 6

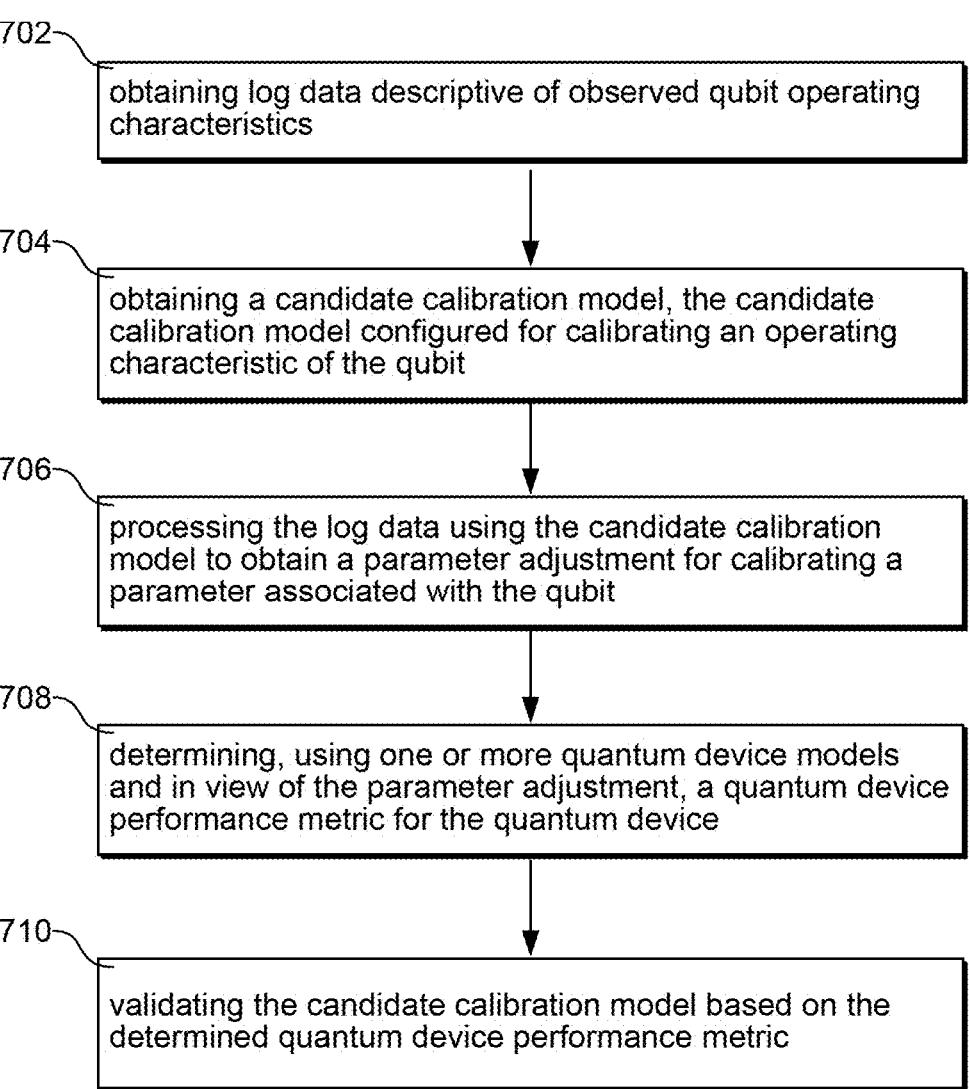

700

702 — obtaining log data descriptive of observed qubit operating characteristics 704 — obtaining a candidate calibration model, the candidate calibration model configured for calibrating an operating characteristic of the qubit 706 — processing the log data using the candidate calibration model to obtain a parameter adjustment for calibrating a parameter associated with the qubit 708 — determining, using one or more quantum device models and in view of the parameter adjustment, a quantum device performance metric for the quantum device 710 — validating the candidate calibration model based on the determined quantum device performance metric

Figure 7

BACKTESTING QUANTUM DEVICE CALIBRATION

FIELD

The present disclosure relates generally to calibrating quantum computing systems.

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as a $|0\rangle + b|1\rangle$. The "0" and "1" states of a digital computer are analogous to the $|0\rangle$ and $|1\rangle$ basis states, respectively of a qubit.

SUMMARY

Aspects and advantages of embodiments of the present disclosure will be set forth in part in the following description, or can be learned from the description, or can be learned through practice of the embodiments.

One example aspect of the present disclosure is directed to an example computer-implemented method for calibrating a qubit of a quantum device. The example method includes obtaining a candidate calibration model for calibrating an operating characteristic of the qubit. The example method includes determining, using one or more quantum device models, a simulated quantum device performance metric associated with implementation of the candidate calibration model based on log data descriptive of observed qubit operating characteristics and associated observed quantum device performance metrics.

Another example aspect of the present disclosure is directed to an example computer-readable storage medium storing instructions that are executable to cause the processing device to perform operations for calibrating a qubit of a quantum device. The operations can include obtaining a candidate calibration model for calibrating an operating characteristic of the qubit. The operations can include determining, using one or more quantum device models, a simulated quantum device performance metric associated with implementation of the candidate calibration model based on log data descriptive of observed qubit operating characteristics and associated observed quantum device performance metrics.

Another example aspect of the present disclosure is directed to an example quantum computing system. The example quantum computing system includes a plurality of superconducting qubits and a calibration system that includes one or more processors and a computer-readable storage medium storing a selected calibration model and instructions that are executable to cause the calibration system to calibrate the quantum device using the selected calibration model. In the example quantum computing system, the selected calibration model can be selected by obtaining a plurality of candidate calibration models for calibrating an operating characteristic of the qubit. In the example quantum computing system, the selected calibration model can be selected by, for each respective candidate calibration model, determining, using the one or more quantum device models and based on the log data, a respective simulated quantum device performance metric associated with implementation of the respective candidate calibration model. In the example quantum computing system, the selected calibration model can be selected by determining the selected calibration model based on a comparison of the plurality of candidate calibration models.

Another example aspect of the present disclosure is directed to an example method of validating a calibration model for calibrating a qubit of a quantum device. The example method includes obtaining log data descriptive of observed qubit operating characteristics. The example method includes obtaining a candidate calibration model, the candidate calibration model configured for calibrating an operating characteristic of the qubit. The example method includes processing the log data using the candidate calibration model to obtain a parameter adjustment for calibrating a parameter associated with the qubit. The example method includes determining, using one or more quantum device models and in view of the parameter adjustment, a quantum device performance metric for the quantum device. The example method includes validating the candidate calibration model based on the determined quantum device performance metric.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, explain the related principles.

BRIEF DESCRIPTION OF THE DRAWINGS

Detailed discussion of embodiments directed to one of ordinary skill in the art is set forth in the specification, which refers to the appended figures, in which:

FIG. 6 depicts a flow chart diagram of an example method for quantum device calibration according to example aspects of the present disclosure;

FIG. 7 depicts a flow chart diagram of an example method for quantum device calibration according to example aspects of the present disclosure;

DETAILED DESCRIPTION

Figure 1:
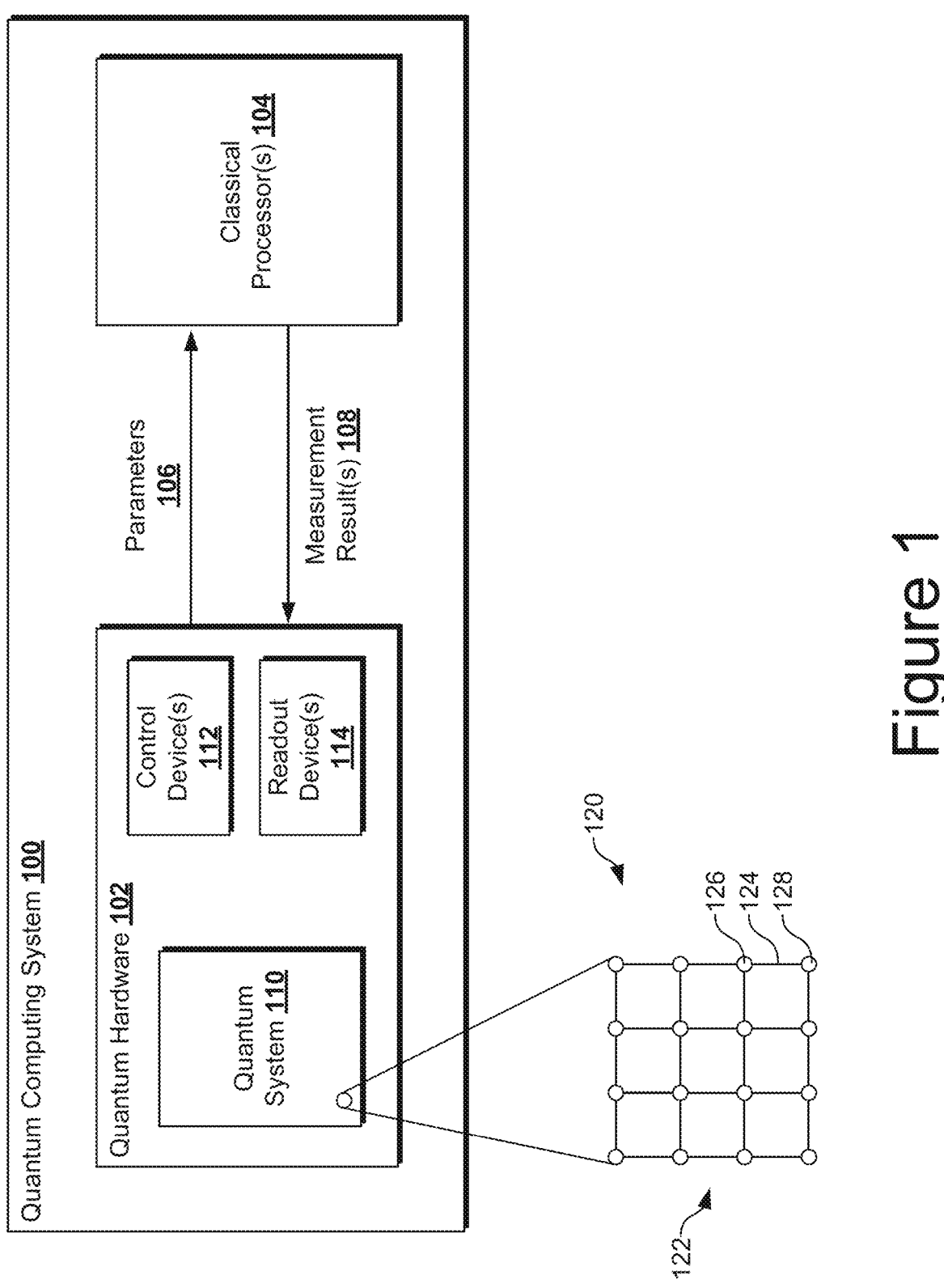
FIG. 1 depicts an example of a quantum computing system for quantum device operation and calibration according to example aspects of the present disclosure.

Example embodiments according to some aspects of the present disclosure are directed to a framework for backtesting calibration models for calibrating quantum processing systems. For example, quantum processing devices and systems can contain superconducting qubits whose performance depends on the stability of various qubit operating characteristics and the amount of drift in the characteristics over time. The performance of quantum processing devices can be maintained by periodic recalibration to address the drift of qubit operating characteristics. Advantageously, aspects of the present disclosure provide for improved development of calibration models by facilitating simulation of calibration models using prior/observed log data for offline evaluation and comparison.

Calibration approaches can vary in technique. Different types of calibration techniques can have different effects on the underlying system. Furthermore, calibration approaches can vary in the timing of individual calibration interventions (e.g., interval between interventions) and the various triggers for initiating a calibration intervention.

Traditionally, different calibration approaches were compared by experimentally implementing candidate calibration models on physical quantum computing systems and monitoring performance metrics of the physical quantum computing systems over time. Such experiments can be costly and time-consuming to implement. Furthermore, in some scenarios, they can even risk damage to the quantum computing systems under test. Advantageously, aspects of the present disclosure provide for simulation of calibration model implementations for offline evaluation and comparison based on historical log data (e.g., backtesting). Log data can describe observed qubit operating characteristics, associated observed quantum device performance metrics, and calibration interventions to adjust the qubit operating characteristics. The log data can be used with one or more quantum device models (optionally machine-learned) to estimate the behavior of the quantum device when calibrated according to a candidate calibration model. In this manner, example embodiments provide an ex-situ environment for testing experimental calibration strategies that can be too slow or risky to test in production.

Example embodiments according to some aspects of the present disclosure can provide for a number of technical effects and benefits, such as improvements to computing technology (e.g., quantum computing technology). For instance, calibration models evaluated and selected according to the present disclosure can improve quantum computing system performance (e.g., uptime, speed, error rate, etc.). Furthermore, the simulation techniques described herein can facilitate obtaining improved and refined calibration models at lower expense (e.g., computational expense, energy expense, equipment maintenance expense, etc.). For instance, candidate calibration models can be tested in a simulated environment and evaluated without requiring protracted in-situ experimental deployments. In this manner, for example, improved calibration techniques can be identified by comparing multiple candidate calibration models in a safe offline environment, and a desired calibration model, once verified, can then be safely deployed in production with greater confidence and lower risk. This can improve the performance of quantum computing systems and decrease the risk of quantum computing device failure or degradation, thereby facilitating advancements in the field of quantum computing as a whole.

Of additional advantage, example embodiments according to some aspects of the present disclosure provide for parallelized calibration model testing and selection. For instance, multiple candidate calibration models can be simulated in parallel to determine their respective potential performance characteristics when applied on a given quantum computing device. In this manner, for instance, calibration models can be evaluated and optimized in parallel, decreasing resource expenditure and advancing the state of quantum computing as a field.

With reference now to the Figures, example embodiments of the present disclosure will be discussed in further detail.

FIG. 1 depicts an example quantum computing system 100. The example system 100 is an example of a system on one or more classical computers or quantum computing devices in one or more locations, in which the systems, components, and techniques described below can be implemented. Those of ordinary skill in the art, using the disclosures provided herein, will understand that other quantum computing structures or systems can be used without deviating from the scope of the present disclosure.

The system 100 includes quantum hardware 102 in data communication with one or more classical processors 104. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits. In some implementations, the multi-level quantum subsystems can include superconducting qubits, such as flux qubits, charge qubits, transmon qubits, gmon qubits, etc.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (e.g., with which states may be prepared without requiring qubits) may be used. Further examples of realizations of multi-level quantum subsystems include fluxmon qubits, silicon quantum dots or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum gates or quantum circuits having a plurality of quantum gates, e.g., Pauli gates, Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines to generate magnetic fields to adjust the frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit and the control device(s) 112 and readout devices(s) 114 may implement one or more quantum logic gates that operate on the quantum system 102 through physical control parameters (e.g., microwave pulses) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameter values 106 from the classical processors 104. The quantum hardware 102 may use the received physical control qubit parameter values 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

The readout device(s) 114 can take advantage of a difference in the impedance for the $|0\rangle$ and $|1\rangle$ states of an element of the quantum system, such as a qubit, to measure the state of the element (e.g., the qubit). For example, the resonance frequency of a readout resonator can take on different values when a qubit is in the state $|0\rangle$ or the state $|1\rangle$, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

In some implementations, the quantum system 110 can include a plurality of qubits 120 arranged, for instance, in a two-dimensional grid 122. For clarity, the two-dimensional grid 122 depicted in FIG. 1 includes 16 qubits arranged in a square formation, however in some implementations the system 110 may include a smaller or a larger number of qubits. In some embodiments, the multiple qubits 120 can interact with each other through multiple qubit couplers, e.g., qubit coupler 124. The qubit couplers can define nearest neighbor interactions between the multiple qubits 120. In some implementations, the strengths of the multiple qubit couplers are tunable parameters. In some cases, the multiple qubit couplers included in the quantum computing system 100 may be couplers with a fixed coupling strength. In some implementations, the multiple qubits 120 may include data qubits, such as qubit 126 and measurement qubits, such as qubit 128. A data qubit is a qubit that participates in a computation being performed by the system 100. A measurement qubit is a qubit that may be used to determine an outcome of a computation performed by the data qubit. That is, during a computation an unknown state of the data qubit is transferred to the measurement qubit using a suitable physical operation and measured via a suitable measurement operation performed on the measurement qubit.

In some implementations, each qubit in the multiple qubits 120 can be operated using respective operating frequencies, such as an idling frequency and/or an interaction frequency and/or readout frequency and/or reset frequency. The operating frequencies can vary from qubit to qubit. For instance, each qubit may idle at a different operating frequency. The operating frequencies for the qubits 120 can be chosen before a computation is performed by the calibration system. Some operating frequencies are better than other operating frequencies. One metric for assessing how good a particular operating frequency is for a particular qubit is energy relaxation time (T1) for the qubit at the frequency. Lower energy relaxation times can lead to larger quantum computational errors.

In various implementations, the example system 100 can be implemented as a client device, a server device, or both. The example system 100 can be implemented as part of a distributed computing system. The example system 100 can be implemented along with other example systems, which may be the same or different. The example system 100 can be implemented in a server farm or other facility that operates multiple computing systems to provide computational services to or on behalf of a plurality of client systems. Advantageously, techniques according to example aspects of the present disclosure can provide for improved calibration and maintenance of computing facilities, increasing service uptime, decreasing failure rates, etc.

Figure 2:
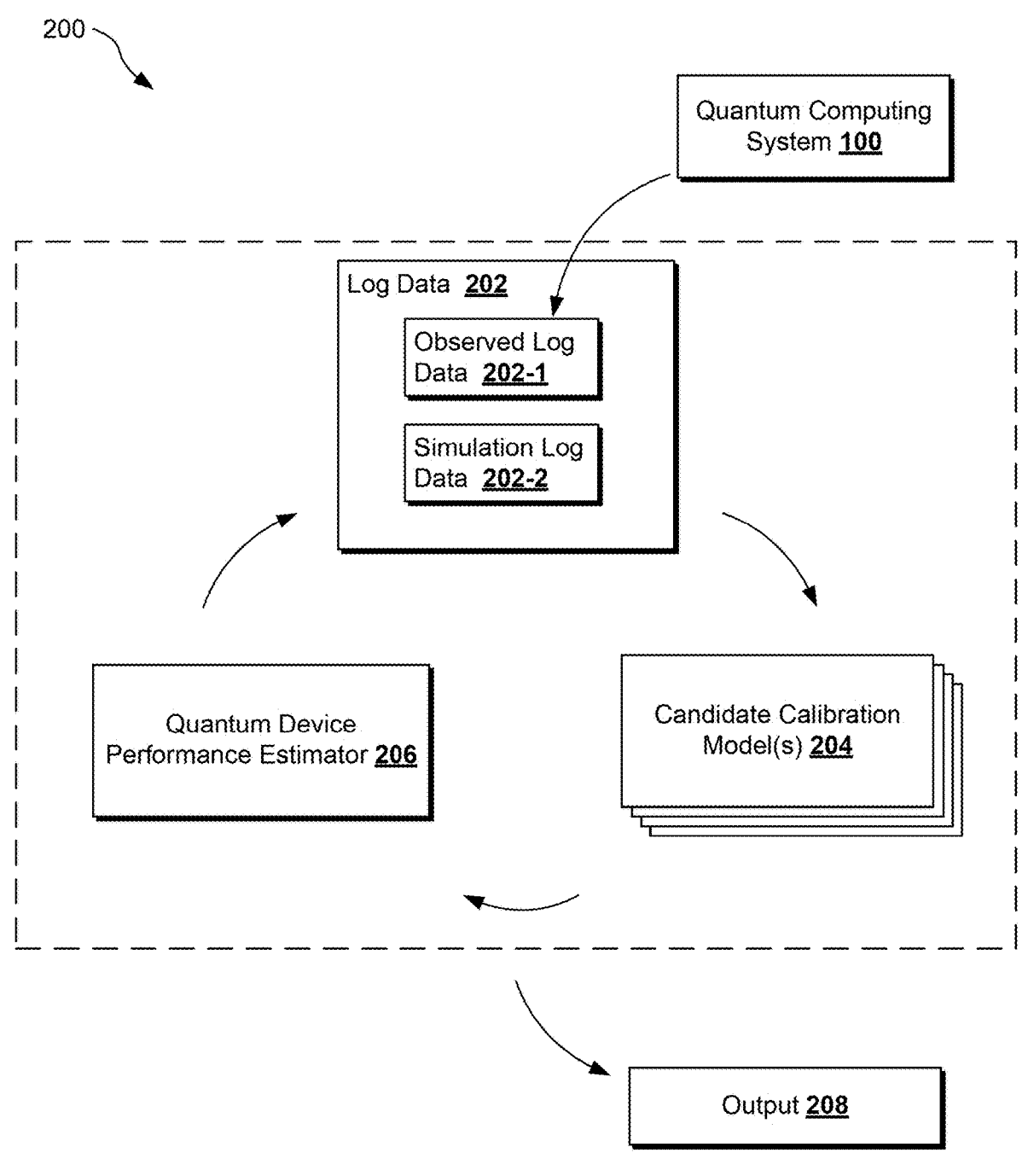
FIG. 2 depicts a block diagram of an example calibration model evaluation architecture according to example aspects of the present disclosure.

FIG. 2 depicts a block diagram of an example simulation architecture 200 for evaluating and selecting calibration models according to aspects of the present disclosure. Log data 202 (e.g., including observed log data 202-1, simulation log data 202-2, etc.) can describe operating characteristics of a quantum computing device or system, such as quantum computing system 100. The log data 202 can be input to one or more candidate calibration models 204 (e.g., as an initial state, etc.). The candidate calibration model(s) 204 can indicate calibration operation(s) to be performed on quantum computing system 100. A quantum device performance estimator 206 can evaluate a state of quantum computing system 100 as modified according to the candidate calibration model(s) 204 to output various estimated performance metrics for quantum computing system 100. The quantum device performance estimator 206 can also provide updated states for generating simulation log data 202-2 for providing initial states for further iterations. Output 208 can include aggregated or cumulative estimated performance characteristics associated with the candidate calibration model(s) 204. Output 208 can be used to select a candidate calibration model 204 for implementation.

For example, log data 202 can include observed log data 202-1 collected by observing real-world quantum computing devices, such as quantum computing system 100. For instance, observed log data 202-1 can include data descriptive of operational characteristics of classical or quantum hardware of quantum computing system 100, such as qubit operational characteristics (e.g., including qubits and qubit couplers) and readout resonator characteristics. Example data includes operating frequencies, such as single qubit gate frequency trajectories, two qubit gate frequency trajectories, readout frequency trajectories, maximum/minimum operating frequencies, anharmonicity of frequencies, bias voltage, coupling efficiency, Ramsey coherence time, spin-echo coherence time, CPMG dephasing time, energy-relaxation time, Rabi oscillations, pulse amplitude, pulse length, pulse frequency, single-qubit randomized benchmarking (RB) error, single-qubit cross-entropy benchmarking (XEB) error, two-qubit RB error, two-qubit XEB error, two-qubit XEB purity error, or other data (e.g., arbitrary metadata, such as timing metadata indicating when data were taken). Observed log data 202-1 can include data in substantially any format or arrangement.

Observed log data 202-1 can include data descriptive of controlled and uncontrolled characteristics. For instance, observed log data 202-1 can describe environmental or other characteristics that are not or cannot be directly controlled. Observed log data 202-1 can describe values of adjustable parameters, such as parameters subject to the control of control devices 112.

Observed log data 202-1 can include data descriptive of prior calibration interventions. Observed log data 202-1 can include parameter adjustments and resultant system behavior associated with the parameter adjustments. For instance, observed log data 202-1 can include prior calibrations applied to quantum computing system 100 and corresponding improvements in performance metrics of quantum computing system 100.

Log data 202 can include simulation log data 202-2. Simulation log data 202-2 can be obtained from simulation, modeling, estimation, etc. of aspects of quantum computing system 100. For instance, simulation log data 202-2 can include current and prior states of quantum computing system 100 as simulated by the simulation architecture 200. For example, just as with observed log data 202-1, simulation log data 202-2 can include, for example, operating frequencies, such as single qubit gate frequency trajectories, two qubit gate frequency trajectories, readout frequency trajectories, maximum/minimum operating frequencies, anharmonicity of frequencies, bias voltage, coupling efficiency, Ramsey coherence time, spin-echo coherence time, CPMG dephasing time, energy-relaxation time, Rabi oscillations, pulse amplitude, pulse length, pulse frequency, single-qubit randomized benchmarking (RB) error, single-qubit cross-entropy benchmarking (XEB) error, two-qubit XEB error, two-qubit XEB purity error, or other data (e.g., arbitrary metadata). Simulation log data 202-2 can include data in substantially any format or arrangement.

Simulation log data 202-2 can be output by the example simulation architecture 200. For example, simulation log data 202-2 can contain measurement values corresponding to observed log data 202-1 that have been output by a simulation of quantum computing system 100 as calibrated according to candidate calibration model(s) 204.

Candidate calibration model(s) 204 can include a plurality of different calibration models. Different calibration models can reflect or embody different strategies for calibration, such as by manipulating different parameters, implementing a different timetable for adjusting parameters, determining whether to intervene at all, etc. Simulation architecture 200 can facilitate comparison of different candidate calibration model(s) 204 in a simulated environment.

Candidate calibration model(s) 204 can receive log data 202 as an input and determine, based on the log data 202, whether and how to adjust one or more aspects of quantum computing system 100 to perform calibration. For instance, candidate calibration model(s) 204 can obtain a value for an operational parameter of a component of quantum computing system 100 and, based on the value, determine a calibration operation to be performed on quantum computing system 100. The calibration operation can be configured to increase performance of the system (e.g., an expected performance, etc.). The obtained value can be received directly from log data 202 or derived therefrom. The obtained value can be a measured or computed value. For instance, the detected value can be a measured characteristic, such as a time period or frequency, or computed, such as an error rate, score, etc.

Candidate calibration model(s) 204 can provide instructions for calibrating one or more aspects of quantum computing system 100. For instance, candidate calibration model(s) 204 can include decision-making heuristics, algorithms, graphs, etc. In some examples, candidate calibration model(s) 204 can include machine-learned components, such as machine-learned models for predicting calibration operations based on current or past state(s) of quantum computing system 100.

Candidate calibration model(s) 204 can be configured (e.g., constructed, trained, etc.) based on prior patterns of calibration interventions. For instance, log data 202 can include data descriptive of prior calibration interventions and their effects on quantum computing system 100. In this manner, for instance, candidate calibration model(s) 204 can learn from the successes of prior calibration interventions. For instance, candidate calibration model(s) 204 can include machine-learned models trained to mimic successful prior calibration interventions.

Different calibration models can use different data modeling techniques (e.g., heuristics, machine-learned techniques, etc.) to extract the operating parameters from log data 202. For instance, various models (machine-learned or otherwise) can be used to extract operating parameters from raw sensor data (e.g., in log data 202). Various operations can be applied to the log data 202 in pre-processing, such as local smoothing, windowing, etc. Example calibration models can use sequence-based machine-learning processing techniques, such as using transformer models, LSTMs, etc. to process portions of log data 202. Example calibration models can use convolutional neural networks to process charts of log data 202, such as frequency spectra.

Different calibration models can interpret and respond to the extracted data using different calibration techniques. For instance, different calibration models can be configured with different responses to a given set of input features (e.g., a given portion of log data 202). For instance, threshold-based heuristics can be configured with different trigger points (e.g., for identifying components with outlier characteristics). Machine-learned calibration models can be trained based on different objectives. For instance, given log data 202 descriptive of a number of qubits, different calibration models can identify different qubits for calibration, different gate frequencies to adjust, or other different operational characteristics to calibrate. In this manner, for example, simulation architecture 200 can facilitate comparison of different candidate calibration model(s) 204 in a simulated environment.

Candidate calibration model(s) 204 can output one or more changes to quantum computing system 100. The changes can include new values for one or more operational characteristics of quantum computing system 100, such as for one or more components of classical or quantum hardware of quantum computing system 100. The changes can include one or more operations to be applied to quantum computing system 100 to effect new values for one or more operational characteristics, such as a retuning operation, quantum operation, or other adjustment.

Candidate calibration model(s) 204 can output changes to any one of or multiple components of quantum computing system 100. For instance, candidate calibration model(s) 204 can output one or more calibrations to quantum hardware 102, including qubits 120, qubit coupler(s) 124, control device(s) 112, readout device(s) 114, etc. The calibrations can be localized, such as calibrations associated with a portion of the quantum hardware 102, such as a subset of the qubits 120 (e.g., one qubit, a pair of qubits, etc.) or a subset of coupler(s) 124 (e.g., one coupler, etc.). The calibrations can be global, such as calibrations applied over all the qubits, all the quantum hardware etc. Adjustments can be to the quantum hardware or to other supporting devices, such as control interfaces, cooling devices, communications devices, etc.

A quantum device performance estimator 206 can receive the output(s) of candidate calibration model(s) 204 and estimate the performance of quantum computing system 100 as calibrated according to the calibration model(s) 204. The quantum device performance estimator 206 can be configured to receive operational characteristics of a quantum device or system and output one or more metrics descriptive of a performance of the quantum device or system. For instance, the quantum device performance estimator 206 can receive calibrated operational characteristics of quantum computing system 100 (or instructions for calibration operations configured to effect calibrated operational characteristics) and generate estimated performance metrics describing the behavior of quantum computing system 100.

Estimated performance metrics can be output as simulation log data 202-2. Additionally, or alternatively, simulation log data 202-2 can include the updated operational characteristics output by candidate calibration model(s) 204. For instance, simulation log data 202-2 can contain updated values based on the estimated metrics from the quantum device performance estimator 206. In this manner, for instance, modified aspects of quantum computing system 100 can be described in simulation log data 202-2 while unmodified aspects of quantum computing system 100 can be described in observed log data 202-1. In this manner, for instance, simulation log data 202-2 can operate as storage for the time history of a current simulation cycle.

For example, observed log data 202-1 can contain a time history of measurements for a qubit 126 and a qubit 128. A candidate calibration model 204 can output calibrations for qubit 128, and quantum device performance estimator 206 can output estimated metrics associated with qubit 128 for a subsequent time step. The estimated metrics for the subsequent time step can be stored in simulation log data 202-2. If multiple candidate calibration model(s) 204 are evaluated in parallel, multiple tracks in simulation log data 202-2 can be maintained respectively for the multiple candidate calibration model(s) 204.

In this manner, for example, the simulation architecture 200 can iteratively simulate the behavior of a quantum computing system 100 under different calibration strategies according to one or more candidate calibration model(s) 204. In subsequent iterations, for example, the initial state processed by the candidate calibration model(s) 204 can include operational characteristics measured from quantum computing system 100, operational characteristics estimated by quantum device performance estimator 206, or both. The simulation architecture 200 can thereby simulate the performance of quantum computing system 100 over time as various components are calibrated according to candidate calibration model(s) 204.

The simulation architecture 200 can execute iterations at various levels of granularity (e.g., spatial precision, temporal precision, etc.). For instance, the simulation architecture 200 can execute iterations at the level of temporal precision of the log data 202 (e.g., an iteration for each recorded measurement in the log data). The simulation architecture 200 can sample the log data 202 to execute iteration at a coarser precision (e.g., for data logged every 12 hours, the simulation architecture 200 can execute iterations based on data sampled for every 24 hours).

In some situations, the level of granularity can be optimized. For instance, highly granular iteration over log data 202 can provide improved simulation accuracy. In some cases, however, the greater number of iterations over more granular log data 202 can use more processing time. Based on a desired level of speed and of accuracy, the level of granularity of the log data 202 or the iterations over log data 202 can be adjusted to achieve a desired target accuracy.

After one or more iterations of simulation architecture 200, output 208 can be generated based on the log data 202. For instance, after one or more iterations, log data 202 can include simulated time histories respectively associated with implementation of the candidate calibration model(s) 204. The simulated time histories can be analyzed for selecting a calibration model of the candidate calibration model(s) 204. The simulated time histories can be provided in output 208. The output 208 can indicate one or more evaluation metrics of the candidate calibration model(s) 204, such as an error rate, uptime, etc.

In this manner, for example, simulation architecture 200 can facilitate evaluation of one or more candidate calibration model(s) 204. Candidate calibration model(s) 204 can be evaluated in series or in parallel. A number of iterations of simulation architecture 200 can be performed for a first candidate calibration model and a number of iterations of simulation architecture 200 can be performed for a second candidate calibration model. The iterations for the first and second candidate calibration model(s) can be interleaved, such that the log data 202 is stepped through once. The iterations for the first and second calibration model(s) can be collated, such that one calibration model is implemented for all of a set of iterations. Additionally, or alternatively, each stage of a given iteration can be executed for each of a plurality of candidate calibration model(s) 204.

Candidate calibration model(s) 204 can be evaluated based on a change in performance of the quantum computing system 100 (e.g., error rate, uptime, etc.). Different calibration models can be constructed and evaluated based on different objectives for quantum computing system 100, such as accuracy, expense, speed, efficiency, stability, risk of damage, etc. One example objective includes a time interval between the emergence of "outlier" gates that exceed some error threshold. One example objective includes a logical error rate or count of a quantum error correction code.

Candidate calibration model(s) 204 can be evaluated based on a performance of the calibration model itself, such as the model's robustness to noisy data, stability over varying levels of granularity, etc. For instance, log data 202 can be noisy or corrupted (e.g., naturally or synthetically). For example, simulation architecture 200 can facilitate evaluation of calibration models' robustness and stability over different levels of noise and different granularity of datasets. For example, simulation architecture 200 can execute multiple sets of one or more iterations for a respective candidate calibration model 204. For each set, log data 202 can be sampled and updated at different levels of granularity. For each set, log data 202 can be noised with different levels of noise. The output 208 can be compared for each set to evaluate the effect(s) of different granularity and different noise on the quality of estimation for the respective candidate calibration model 204. For instance, an output from a zero or low noise, full-fidelity set of iterations can be used as a reference point against which noised or lower-granularity sets of iterations can be compared. In this manner, for instance, the robustness to noise and the stability over sparse data for a respective candidate calibration model 204 can be evaluated to determine any impact on or degradation of the quality of the simulation. For instance, it may be desired to evaluate multiple candidate calibration model(s) 204 in this manner to determine a candidate calibration model 204 with a desired tradeoff between efficient computation (e.g., with noisier data, less granular data, etc.) and quality of output.

Figure 3:
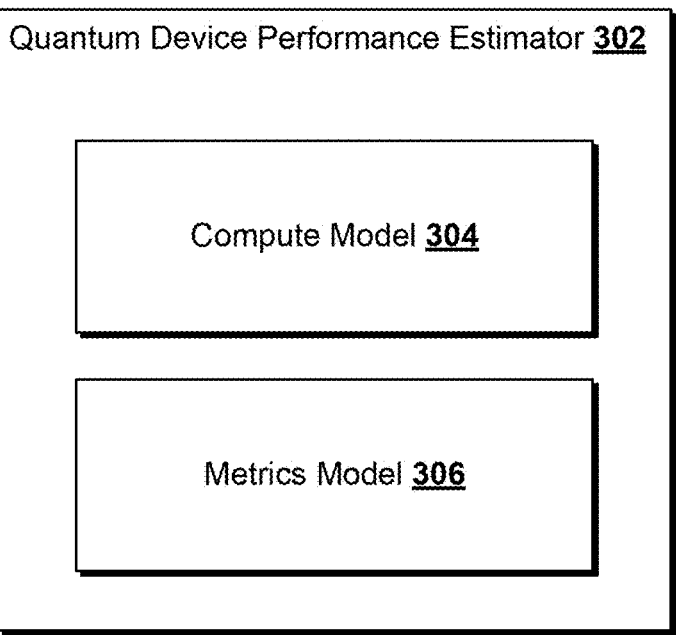
FIG. 3 depicts a block diagram of example aspects of an example calibration model evaluation architecture according to example aspects of the present disclosure.

FIG. 3 depicts a block diagram of an example quantum device performance estimator 302 that includes multiple component models, such as any one of or both of compute model 304 and a metrics model 306. The quantum device performance estimator 302 can receive log data 202 and data descriptive of one or more calibrated parameters (e.g., from one or more calibration models 204) and output an estimation of a quantum device performance (e.g., results of a quantum operations, characterizations thereof, etc.).

A compute model 304 can be configured to estimate the behavior of the quantum computing system 100 when performing a quantum operation. The compute model 304 can be configured to estimate the results of the quantum operation, including intermediate and final states of, for example, the quantum hardware 102 throughout the performance of the quantum operation.

A metrics model 306 can be configured to estimate one or more operational characteristics of the quantum computing system 100 based on the inputs provided to the quantum device performance estimator 302. The metrics model 306 can generate benchmarking metrics (e.g., error rates, etc.) based on the output(s) of the compute model 304. The metrics model 306 can generate benchmarking metrics directly from the inputs provided to the quantum device performance estimator 302, optionally without first simulating computation with the compute model 304.

For example, a metrics model 306 can include a machine-learned model trained to predict an estimated performance of quantum computing system 100 directly from log data 202 and one or more calibrated parameters. For instance, log data 202 can include data descriptive of a current state of quantum computing system 100 as well as past state(s). The metrics model 306 can be trained (e.g., using a corpus of log data) to predict a future state based on the current and past state(s). The metrics model 306 can be any suitable type of machine-learned model. In this manner, for instance, the metrics model 306 can directly estimate a future state of the quantum computing system 100 when a candidate calibration model 204 provides one or more calibrated values to update at least a portion of a current state (e.g., a new gate frequency, etc.). Accordingly, the simulation architecture 200 can avoid, in some cases, computing quantum algorithms directly. In this manner, for instance, quantum device performance estimator 302 can efficiently output metrics that characterize the performance of the quantum computing system 100 when calibrated according to various candidate calibration model(s) 204.

Figure 4:
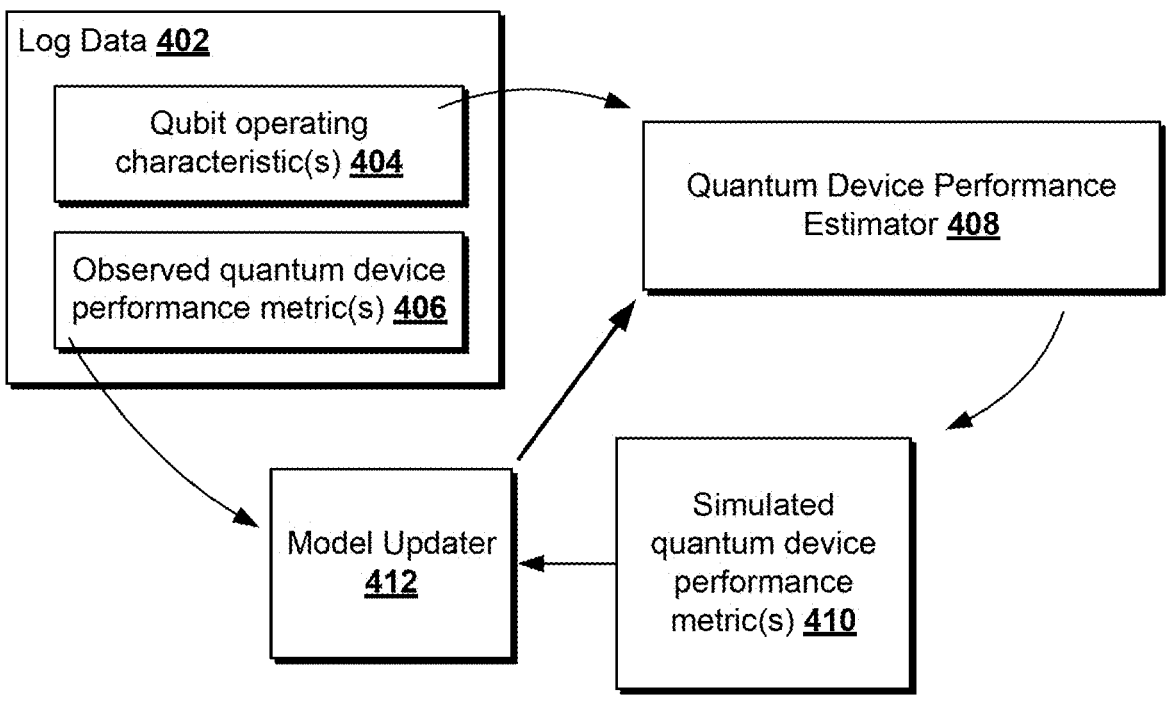
FIG. 4 depicts a machine-learning processing architecture for an example calibration model evaluation architecture according to example aspects of the present disclosure.

FIG. 4 depicts a machine-learning processing architecture for training a quantum device performance estimator for an example calibration model evaluation architecture according to example aspects of the present disclosure. Log data 402 can describe qubit operating characteristics 404 associated with observed quantum device performance metrics 406. The qubit operating characteristics 404 can be input to quantum device performance estimator 408 for outputting simulated quantum device performance metric(s) 410. A model updater 412 can evaluate the simulated quantum device performance metric(s) 410 against the observed quantum device performance metric(s) 406. The model updater 412 can update quantum device performance estimator 408 based on the evaluation.

Log data 402 can describe qubit operating characteristics 404. Qubit operating characteristics 404 can include substantially any measured or computed descriptor of qubit behavior, coupling behavior, control device behavior, readout device behavior, etc.

Qubit operating characteristics 404 can be associated with observed quantum device performance metrics 406. Observed quantum device performance metrics 406 can include measured or computed descriptors of a performance of a quantum computing system 100, or portions thereof. The performance can describe error rates, uptime, stability, etc.

Quantum device performance estimator 408 can include one or more machine-learned models. For instance, quantum device performance estimator 408 can include a metrics model 306. Quantum device performance estimator 408 can be configured to receive the qubit operating characteristics 404 (e.g., current state(s), past state(s), etc.) and predict performance metric(s) 410.

Model updater 412 can train the quantum device performance estimator 408. Training can be supervised using the observed quantum device performance metric(s) 406. For instance, a loss can be computed based on the observed quantum device performance metric(s) 406 and the predicted performance metric(s) 410. Model updater 412 can update one or more learnable parameters of the quantum device performance estimator 408 based on the loss. For instance, the loss can be backpropagated through the quantum device performance estimator 408 for updating the parameters. Various other machine learning techniques can be applied.

Figure 5A:
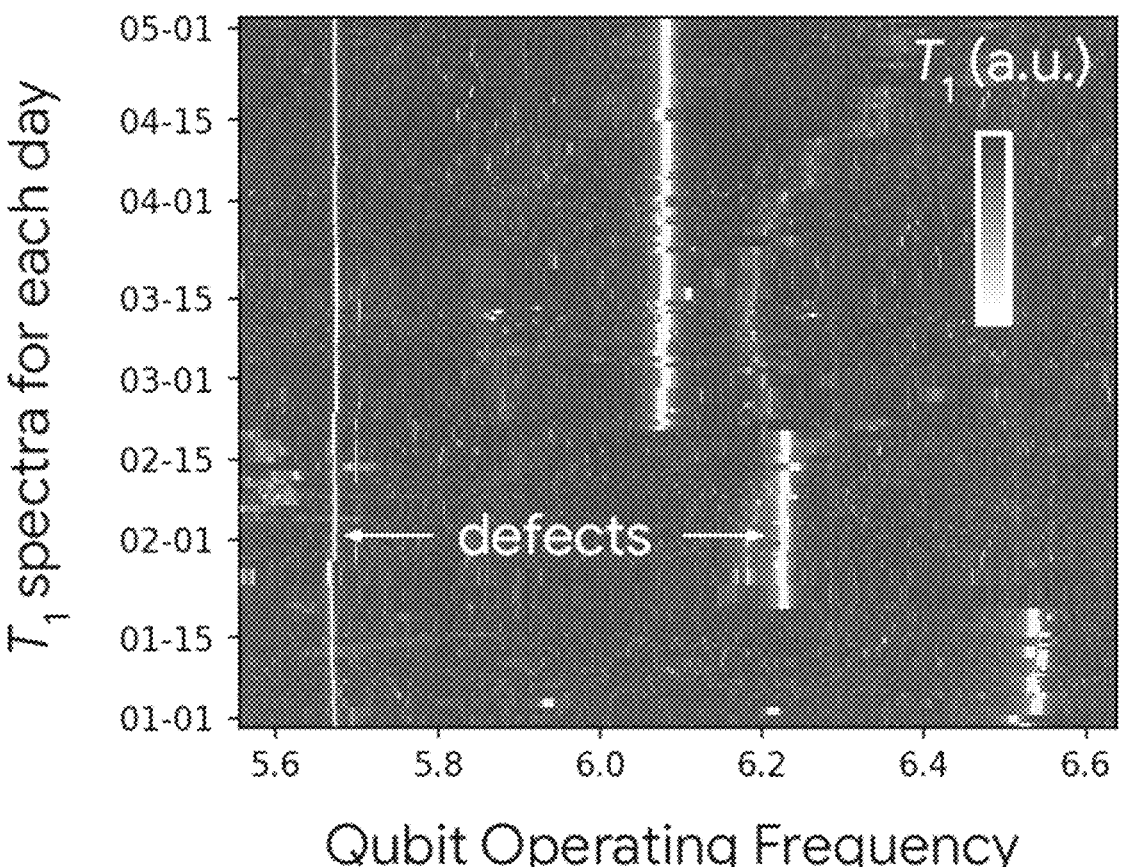
FIG. 5A depicts example log data for input to an example calibration model evaluation architecture according to example aspects of the present disclosure.
Figure 5B:
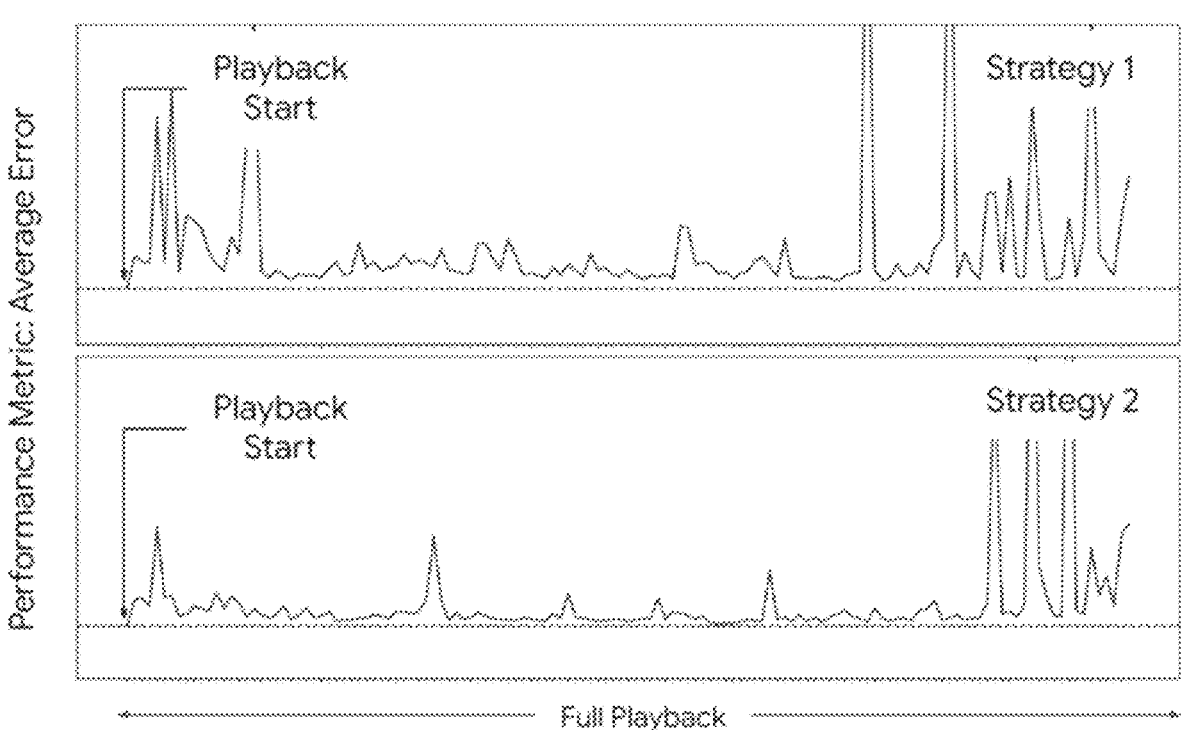
FIG. 5B depicts example results for an example calibration model evaluation architecture according to example aspects of the present disclosure.
Figure 5C:
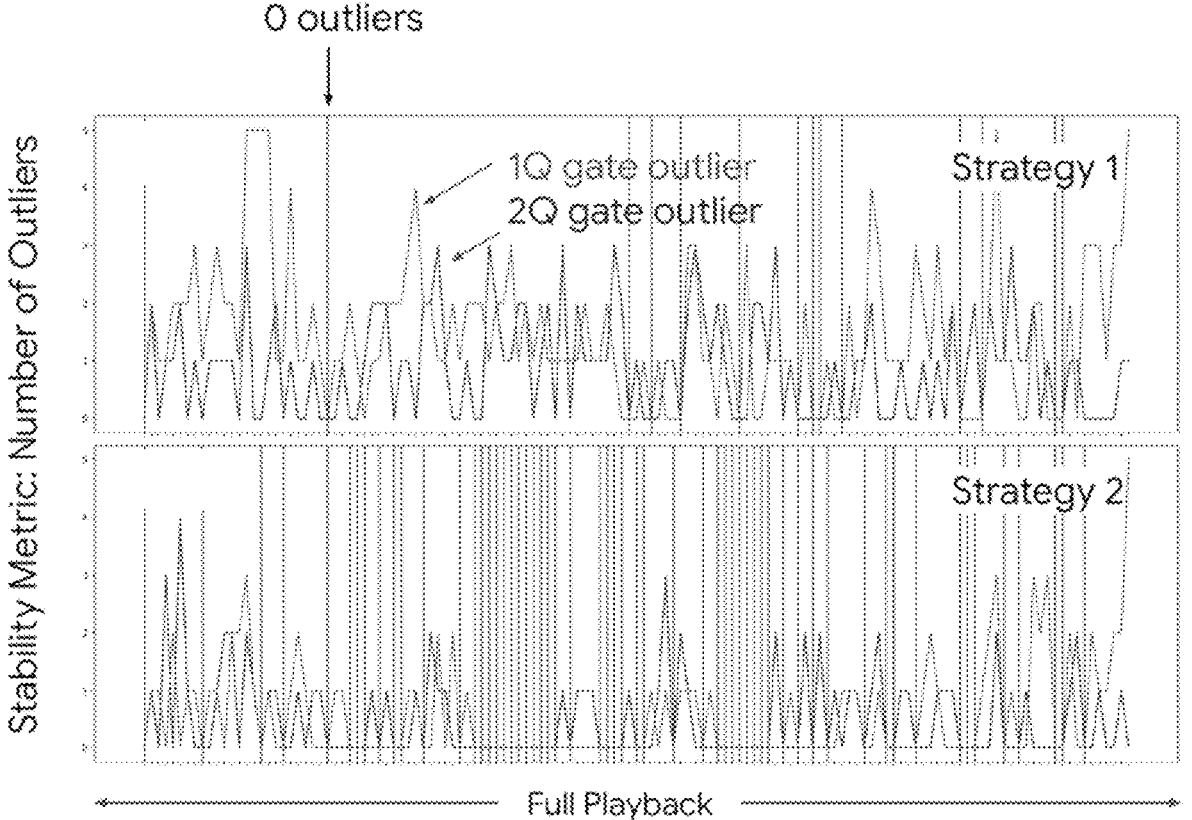
FIG. 5C depicts example results for an example calibration model evaluation architecture according to example aspects of the present disclosure.

Example results of a simulation according to aspects of the present disclosure are discussed with respect to FIGS. 5A, 5B, and 5C.

One component of a calibration system for frequency-tunable superconducting qubits can be a frequency optimization system. A frequency optimization system can leverage a model of the quantum algorithm for which the processor is being calibrated from the calibration data. A frequency optimization system can optimize that model to determine single- and two-qubit gate frequencies that are expected to maximize quantum algorithm performance. The system can take numerous types of characterization data. For simplicity and without loss of generality, the present example references qubit energy-relaxation spectra (e.g., T1 versus frequency).

FIG. 5A depicts measured energy-relaxation spectra for a single qubit taken over several months. The spectra show an example of log data. The spectra can be considered to be an uncontrolled characteristic. The spectra can be stored in log data, such as observed log data 202-1. The spectra can be obtained by measuring qubits while performing quantum operations (e.g., until a timeout or a failure is detected). This example dataset has features that motivate testing several calibration strategies, as described next. One feature of this dataset is that there are "relaxation hotspots" ("defects" in the figure) that fluctuate in frequency and in time. As the defects fluctuate in time, performance metrics for the quantum computing system can fluctuate in frequency and in time. For example, the performance of a single-qubit gate set to operate near 6.1 GHz can be performant before 02-15, but might degrade substantially thereafter due to the abrupt appearance of a hotspot near that frequency.

In the present example, two candidate calibration models are evaluated. Strategy 1 uses a candidate calibration model that is a null model: no calibration is performed. Strategy 2 uses a candidate calibration model that calibrates all outlier gate frequencies when detected to improve system performance in view of the time-varying relaxation hotspots.

During iterations of the simulation architecture 200 in the present example, T1 spectra for the qubit (e.g., from the chart in FIG. 5A) are input into the respective calibration models to obtain updated state(s) for the qubit (e.g., strategy 1 providing a pass-through of the current state; strategy 2 providing an adjusted gate frequency if determined to be an outlier). Updated state data can be stored as simulation log data 202-2. A quantum device performance estimator can implement a machine-learned metrics model pre-trained to estimate parallel XEB benchmarking error from T1 spectra to compute a model of all metrics. In subsequent iterations, the spectra can be read from observed log data 202-1 and simulated state data can be read from simulation log data 202-2.

Average error metrics output by the simulation architecture 200 in the present example are shown in FIG. 5B. In the present example, Strategy 2, which actively re-optimizes performance outliers, outperforms Strategy 1. Based on the improved error performance estimated for Strategy 2, Strategy 2 can be deployed for calibrating quantum computing system 100. Additional results are shown in FIG. 5C. Vertical lines indicate instances of zero outliers.

FIG. 6 depicts a flowchart of a method 600 for calibrating a quantum device according to aspects of the present disclosure. One or more portion(s) of the method 600 can be implemented by a computing system that includes one or more computing devices such as, for example, the computing systems described with reference to the other figures (e.g., systems and devices of FIG. 1, architectures of FIGS. 2 to 5, systems and devices of FIGS. 8A to 8C, etc.). Each respective portion of the method 600 can be performed by any (or any combination) of one or more computing devices. Moreover, one or more portion(s) of the method 600 can be implemented on the hardware components of the device(s) described herein. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 6 is described with reference to elements/terms described with respect to other systems and figures for exemplary illustrated purposes and is not meant to be limiting. One or more portions of method 600 can be performed additionally, or alternatively, by other systems.

At 602, method 600 can include obtaining a candidate calibration model for calibrating an operating characteristic of a qubit. Candidate calibration model(s) can provide instructions for calibrating one or more aspects of a quantum computing system. For instance, candidate calibration model(s) can include decision-making heuristics, algorithms, graphs, etc. In some examples, candidate calibration model(s) can include machine-learned components, such as machine-learned models for predicting calibration operations based on current or past state(s) of the quantum computing system.

At 604, method 600 can include determining, using one or more quantum device models, a simulated quantum device performance metric associated with implementation of the candidate calibration model based on log data descriptive of observed qubit operating characteristics and associated observed quantum device performance metrics.

For example, method 600 can include determining, using the candidate calibration model, an input to the one or more quantum device models.

For example, in method 600, the input can be associated with a change to the operating characteristic of the qubit according to the candidate calibration model.

For example, in method 600, the input can be an updated operating characteristic of the qubit as calibrated according to the candidate calibration model.

For example, in method 600, the one or more quantum device models can include a machine-learned model trained to map the qubit operating characteristics to the associated observed quantum device performance metrics.

For example, in method 600, the one or more quantum device models can include a model configured to simulate one or more compute operations of the quantum device.

For example, in method 600, the observed qubit operating characteristics can include at least one characteristic selected from single qubit gate frequency trajectories, two qubit gate frequency trajectories, readout frequency trajectories, maximum operating frequency, qubit frequency anharmonicity, qubit bias voltage, qubit-to-qubit coupling efficiency, Ramsey coherence time, spin-echo coherence time versus frequency, CPMG dephasing time, energy-relaxation time, Rabi oscillations, single-qubit randomized benchmarking error, single-qubit cross-entropy benchmarking error, two-qubit XEB error, or two-qubit XEB purity error.

For example, in method 600, the simulated quantum device performance metric can include at least one performance metric selected from an error rate of the quantum device, a quantity of outlier gates of the quantum device, or an uptime of the quantum device.

For example, in method 600, the candidate calibration model can be one of a plurality of candidate calibration models. For instance, method 600 can include, for each respective candidate calibration model of the plurality of candidate calibration models, determining, using the one or more quantum device models and based on the log data, a respective simulated quantum device performance metric associated with implementation of the respective candidate calibration model, and determining a selected calibration model based on a comparison of the plurality of candidate calibration models. For instance, method 600 can include calibrating the quantum device using the selected calibration model.

FIG. 7 depicts a flowchart of a method 700 for validating a calibration model for calibrating a quantum device according to aspects of the present disclosure. One or more portion(s) of the method 700 can be implemented by a computing system that includes one or more computing devices such as, for example, the computing systems described with reference to the other figures (e.g., systems and devices of FIG. 1, architectures of FIGS. 2 to 5, systems and devices of FIGS. 8A to 8C, etc.). Each respective portion of the method 700 can be performed by any (or any combination) of one or more computing devices. Moreover, one or more portion(s) of the method 700 can be implemented on the hardware components of the device(s) described herein. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

At 702, method 700 can include obtaining log data descriptive of observed qubit operating characteristics.

At 704, method 700 can include obtaining a candidate calibration model, the candidate calibration model configured for calibrating an operating characteristic of the qubit.

At 706, method 700 can include processing the log data using the candidate calibration model to obtain a parameter adjustment for calibrating a parameter associated with the qubit. For instance, the parameter adjustment can include a new value for a parameter. For instance, the parameter adjustment can include a control input for updating the value of the parameter.

At 708, method 700 can include determining, using one or more quantum device models and in view of the parameter adjustment, a quantum device performance metric for the quantum device. For instance, a quantum device model can process the parameter adjustment and optionally other data (e.g., other log data) and output the quantum device performance metric.

At 710, method 700 can include validating the candidate calibration model based on the determined quantum device performance metric. Validating the candidate calibration model can include determining an expected performance change or improvement of the quantum device. For instance, a change or improvement can be determined against a baseline calibration model. For instance, a baseline calibration model can include a passthrough model that does not calibrate one or more parameters, or any parameters. A baseline calibration model can include an arbitrary calibration model, such as a prior calibration model, a previously implemented calibration model, another candidate calibration model, etc.

For example, in method 700, the candidate calibration model can be one of a plurality of candidate calibration models. For example, method 700 can include validating the calibration model based on a comparison of the plurality of candidate calibration models by, for each respective candidate calibration model, processing the log data using the respective candidate calibration model to obtain a respective parameter adjustment for calibrating a respective parameter associated with the qubit, and determining, using the one or more quantum device models and in view of the respective parameter adjustment, a respective quantum device performance metric for the quantum device.

For example, method 700 can include calibrating the quantum device using the validated calibration model.

For example, in method 700, processing the log data using the candidate calibration model to obtain the parameter adjustment for calibrating the parameter associated with the qubit can include: inputting, from the log data, one or more values of the parameter to the candidate calibration model, and obtaining the parameter adjustment based on an output of the candidate calibration model.

For example, method 700 can include determining, using the candidate calibration model, an input to the one or more quantum device models.

For example, in method 700, the one or more quantum device models can include a machine-learned model trained to map qubit operating characteristics to associated observed quantum device performance metrics.

Figure 8A:
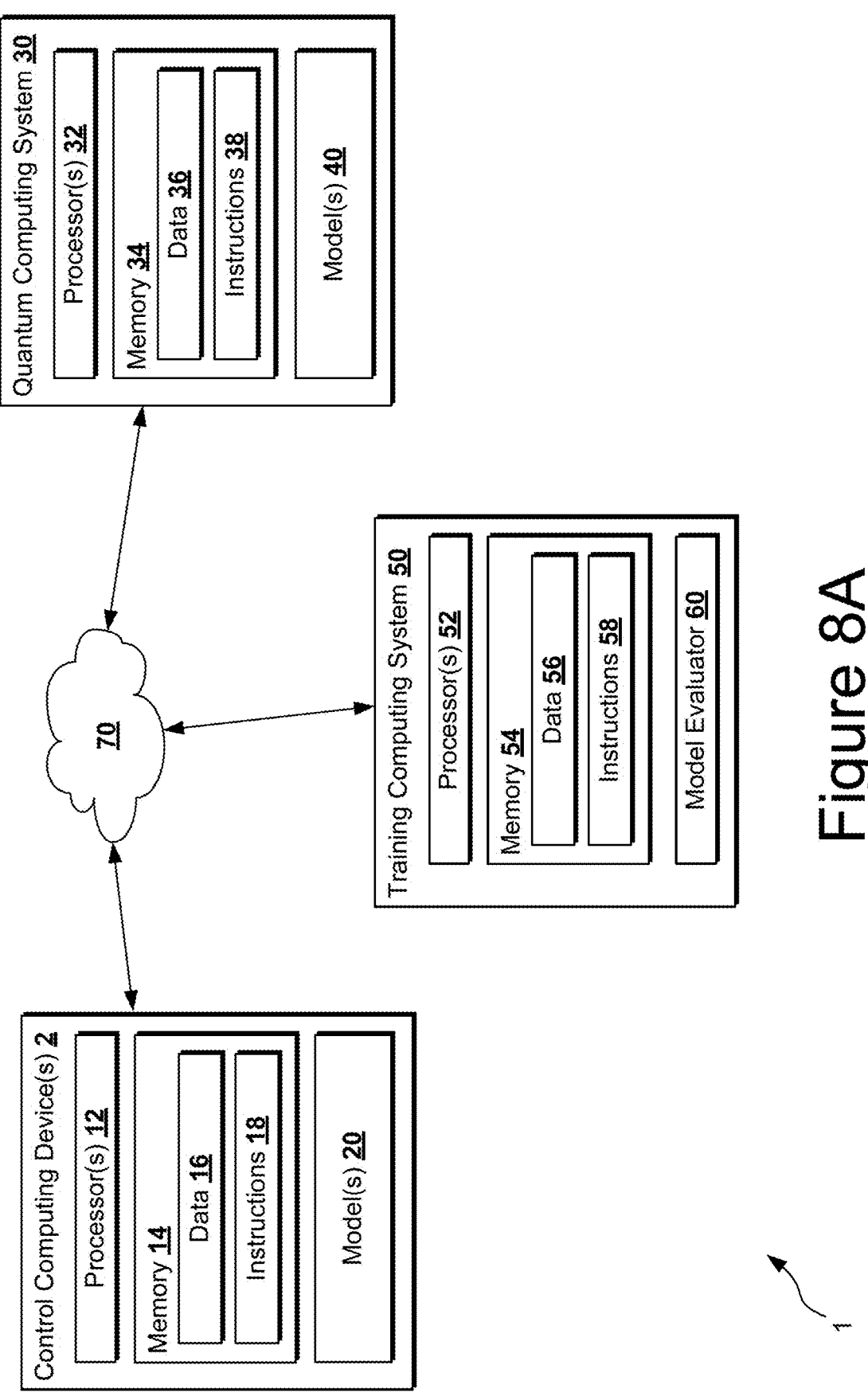
FIG. 8A depicts a block diagram of an example computing system for implementing calibration model evaluation according to example aspects of the present disclosure.

FIG. 8A depicts a block diagram of an example computing system 1 that can perform according to example embodiments of the present disclosure, such as the system discussed with reference to FIG. 1. The system 1 includes a control computing device 2, a quantum computing system 30, and a training computing system 50 that are communicatively coupled over a network 70.

The control computing device 2 can be any type of computing device (e.g., classical computing device), such as, for example, a mobile computing device (e.g., smartphone or tablet), a personal computing device (e.g., laptop or desktop), a workstation, a cluster, a gaming console or controller, a wearable computing device, an embedded computing device, or any other type of computing device. In some embodiments, the computing device 2 can be a client computing device. The computing device 2 can include one or more processors 12 and a memory 14. The one or more processors 12 can be any suitable processing device (e.g., a processor core, a microprocessor, an ASIC, an FPGA, a controller, a microcontroller, etc.) and can be one processor or a plurality of processors that are operatively connected. The memory 14 can include one or more non-transitory computer-readable storage media, such as RAM, ROM, EEPROM, EPROM, flash memory devices, magnetic disks, etc., and combinations thereof. The memory 14 can store data 16 and instructions 18 which are executed by the processor 12 to cause the user computing device 2 to perform operations as described herein.

In some implementations, the control computing device 2 can store or include one or more models 20. The model(s) 20 can be calibration models for calibrating one or more portions of the quantum computing system 20 (e.g., qubits, etc.). For example, the models 20 can be or can otherwise include various machine-learned models such as neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, one or more models 20 can be transmitted to or received from the quantum computing system 30 over network 70, stored in the computing device memory 14, and used or otherwise implemented by the one or more processors 12. In some implementations, the computing device 2 can implement multiple parallel instances of model(s) 20.

Additionally, or alternatively, one or more models 40 can be included in or otherwise stored and implemented by the quantum computing system 30 that communicates with the computing device 2. For example, the models 40 can be implemented by the quantum computing system 40 for calibrating the quantum computing system 30.

The computing device 2 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The quantum computing system 30 can include one or more processors 32 (e.g., classical processor(s) 104) and a memory 34. The one or more processors 32 can be any suitable processing device (e.g., a processor core, a microprocessor, an ASIC, an FPGA, a controller, a microcontroller, etc.) and can be one processor or a plurality of processors that are operatively connected. The memory 34 can include one or more non-transitory computer-readable storage media, such as RAM, ROM, EEPROM, EPROM, flash memory devices, magnetic disks, etc., and combinations thereof. The memory 34 can store data 36 and instructions 38 which are executed by the processor 32 to cause the server computing system 30 to perform operations as described herein.

The quantum computing system 30 can also include quantum hardware 102, described above with reference to FIG. 1, for performing quantum computations.

In some implementations, the quantum computing system 30 includes or is otherwise implemented by one or more server computing devices. In instances in which the quantum computing system 30 includes plural server computing devices, such server computing devices can operate according to sequential computing architectures, parallel computing architectures, or some combination thereof.

As described above, the quantum computing system 30 can store or otherwise include one or more models 40. For example, the models 40 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The computing device 2 or the quantum computing system 30 can select, update, train, or otherwise iterate over example embodiments of a model (e.g., including models 20 or 40). In some embodiments, the computing device 2 or the quantum computing system 30 can train example embodiments of a machine-learned model (e.g., including models 20 or 40) via interaction with the training computing system 50. In some embodiments, the training computing system 50 can be communicatively coupled over the network 70. The training computing system 50 can be separate from the quantum computing system 30 or can be a portion of the quantum computing system 30 or the control computing device 2.

The training computing system 50 can include one or more processors 52 and a memory 54. The one or more processors 52 can be any suitable processing device (e.g., a processor core, a microprocessor, an ASIC, an FPGA, a controller, a microcontroller, etc.) and can be one processor or a plurality of processors that are operatively connected. The memory 54 can include one or more non-transitory computer-readable storage media, such as RAM, ROM, EEPROM, EPROM, flash memory devices, magnetic disks, etc., and combinations thereof. The memory 54 can store data 56 and instructions 58 which are executed by the processor 52 to cause the training computing system 50 to perform operations. In some implementations, the training computing system 50 includes or is otherwise implemented by one or more server computing devices.

Parameters of the model(s) can be trained, in some embodiments, using various training or learning techniques, such as, for example, backwards propagation of errors. For example, an objective or loss can be backpropagated through pretraining, general training, or finetuning pipeline(s) to update one or more parameters of the model(s) (e.g., based on a gradient of the loss function). Various determinations of loss can be used, such as mean squared error, likelihood loss, cross entropy loss, hinge loss, or various other loss functions. Gradient descent techniques can be used to iteratively update the parameters over a number of training iterations. In some implementations, performing backwards propagation of errors can include performing truncated backpropagation through time. The pipeline(s) can perform a number of generalization techniques (e.g., weight decays, dropouts, etc.) to improve the generalization capability of the models being trained.

The model trainer 60 can include computer logic utilized to provide desired functionality. The model trainer 60 can be implemented in hardware, firmware, or software controlling a general-purpose processor. For example, in some implementations, the model trainer 60 includes program files stored on a storage device, loaded into a memory, and executed by one or more processors. In other implementations, the model trainer 60 includes one or more sets of computer-executable instructions that are stored in a tangible computer-readable storage medium such as RAM, hard disk, or optical or magnetic media.

The network 70 can be any type of communications network (e.g., classical or quantum), such as a local area network (e.g., intranet), wide area network (e.g., Internet), or some combination thereof and can include any number of wired or wireless links. In general, communication over the network 70 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

FIG. 8A illustrates one example computing system that can be used to implement the present disclosure. Other computing systems can be used as well. For example, in some implementations, the computing device 2 can include the model trainer 60. In such implementations, a training pipeline can be used locally at the computing device 2.

Figure 8B:
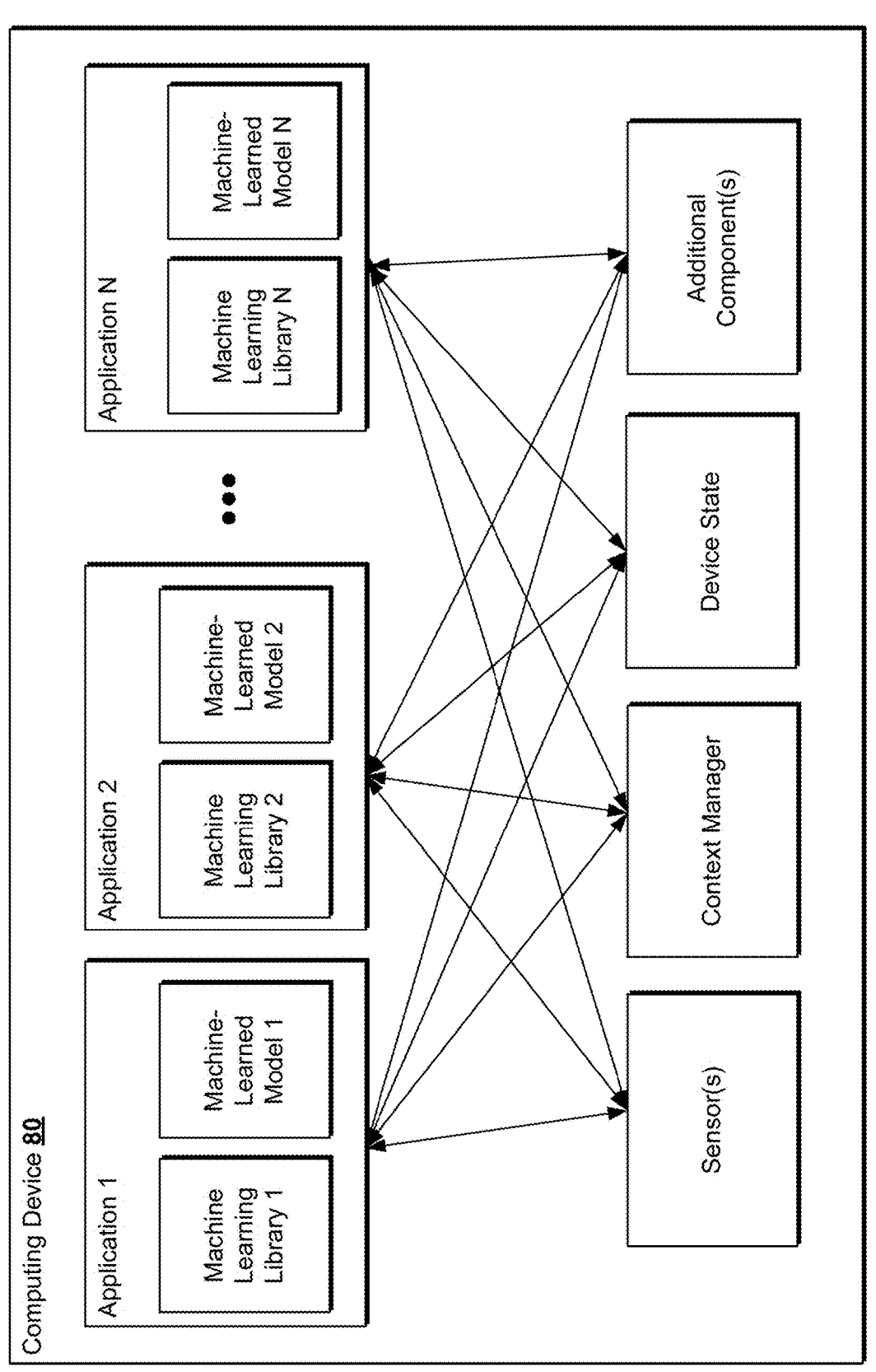
FIG. 8B depicts a block diagram of an example computing device for implementing calibration model evaluation according to example aspects of the present disclosure.

FIG. 8B depicts a block diagram of an example computing device 80 that performs according to example embodiments of the present disclosure. The computing device 80 can be a client computing device or a server computing device. The computing device 80 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 8B, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 8C:
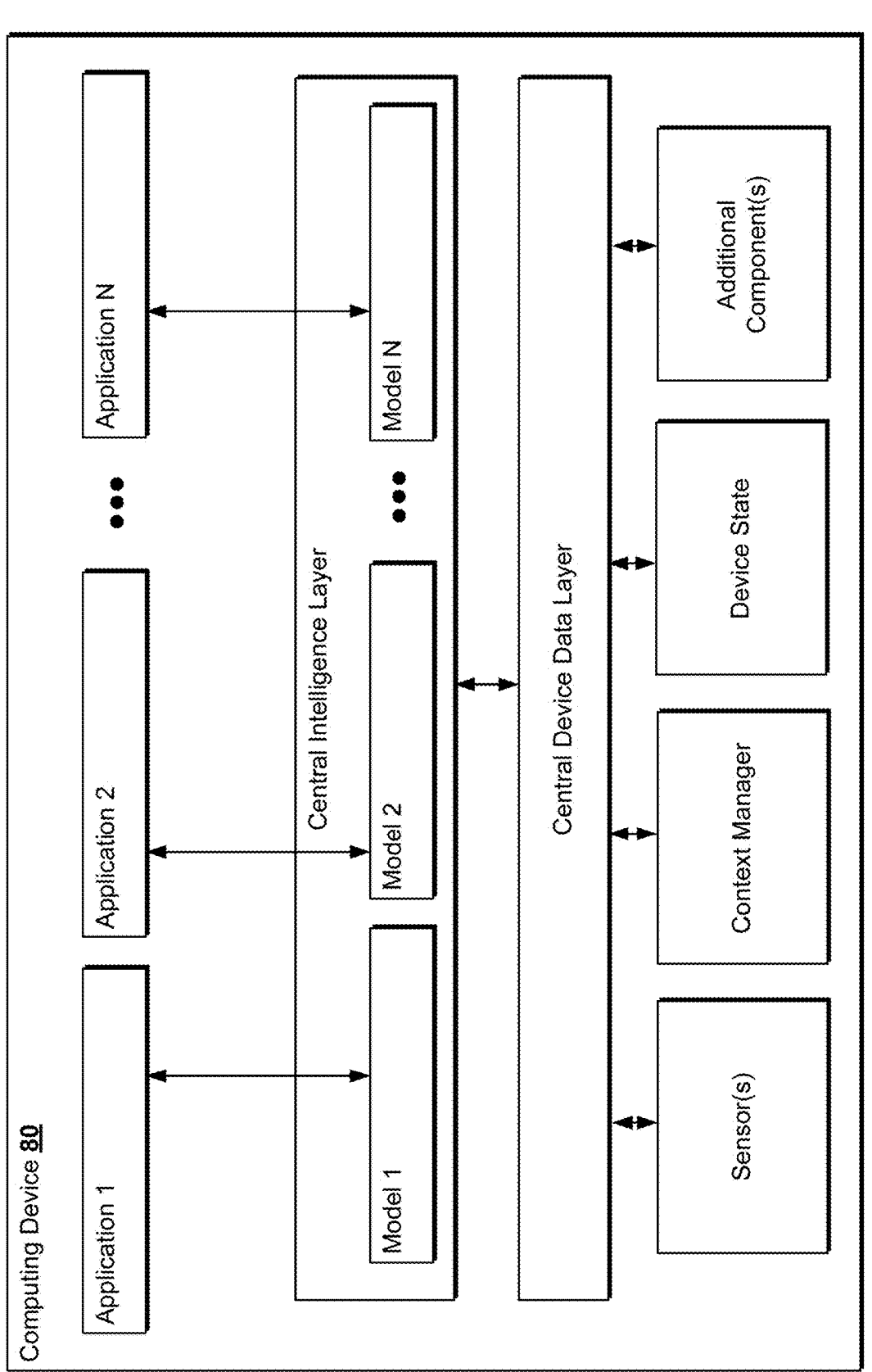
FIG. 8C depicts a block diagram of an example computing device for implementing calibration model evaluation according to example aspects of the present disclosure.

FIG. 8C depicts a block diagram of an example computing device 80 that performs according to example embodiments of the present disclosure. The computing device 80 can be a user computing device or a server computing device. The computing device 80 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 8C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 80.

The central intelligence layer can communicate with a central device data layer. The central device data layer can be a centralized repository of data for the computing device 80. As illustrated in FIG. 8C, the central device data layer can communicate with a number of other components of the computing device, such as, for example, one or more sensors, a context manager, a device state component, or additional components. In some implementations, the central device data layer can communicate with each device component using an API (e.g., a private API).

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs (e.g., one or more modules of digital and/or quantum computer program instructions encoded on a tangible non-transitory storage medium for execution by, or to control the operation of, data processing apparatus). The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit (i.e., a system that defines the unit of quantum information). It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qudits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital or classical computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

What is claimed is:

1. A method for calibrating a qubit of a quantum device, the method comprising:
obtaining a candidate calibration model for calibrating an operating characteristic of the qubit;
determining, using the candidate calibration model, an input to one or more quantum device models; and
determining, using the one or more quantum device models to estimate the behavior of the quantum device when calibrated according to the input, a simulated quantum device performance metric associated with implementation of the candidate calibration model based on log data descriptive of observed qubit operating characteristics and associated observed quantum device performance metrics.

2. The method of claim 1, wherein the candidate calibration model is one of a plurality of candidate calibration models, and wherein the method comprises:
for each respective candidate calibration model: determining, using the one or more quantum device models and based on the log data, a respective simulated quantum device performance metric associated with implementation of the respective candidate calibration model; and
determining a selected calibration model based on a comparison of the plurality of candidate calibration models.

3. The method of claim 2, comprising:
calibrating the quantum device using the selected calibration model.

4. The method of claim 1, comprising:
based on the simulated quantum device performance metric, calibrating the quantum device using the candidate calibration model.

5. The method of claim 1, wherein the input is associated with a change to the operating characteristic of the qubit according to the candidate calibration model.

6. The method of claim 1, wherein the input is an updated operating characteristic of the qubit as calibrated according to the candidate calibration model.

7. The method of claim 1, wherein the one or more quantum device models comprise a machine-learned model trained to map the qubit operating characteristics to the associated observed quantum device performance metrics.

8. The method of claim 1, wherein the candidate calibration model specifies a calibration strategy for the quantum computing device.

9. The method of claim 1, wherein the observed qubit operating characteristics comprise at least one characteristic selected from:
single qubit gate frequency trajectory;
two qubit gate frequency trajectory;
readout frequency trajectory;
maximum operating frequency;
qubit frequency anharmonicity;
qubit bias voltage;
qubit-to-qubit coupling efficiency;
Ramsey coherence time;
spin-echo coherence time versus frequency;
CPMG dephasing time;
energy-relaxation time;
Rabi oscillations;
single-qubit randomized benchmarking error;
single-qubit cross-entropy benchmarking error;
two-qubit XEB error;
two-qubit XEB purity error;
N-qubit randomized benchmarking error; or
N-qubit cross-entropy benchmarking error.

10. The method of claim 1, wherein the simulated quantum device performance metric comprises at least one performance metric selected from:
an error rate of the quantum device;
a quantity of outlier gates of the quantum device; or
an uptime of the quantum device.

11. A computer-readable storage medium comprising instructions that are executable to cause a processing device to perform operations for calibrating a qubit of a quantum device, the operations comprising:
obtaining a candidate calibration model for calibrating an operating characteristic of the qubit;
determining, using the candidate calibration model, an input to one or more quantum device models; and
determining, using the one or more quantum device models to estimate the behavior of the quantum device when calibrated according to the input, a simulated quantum device performance metric associated with implementation of the candidate calibration model based on log data descriptive of observed qubit operating characteristics and associated observed quantum device performance metrics.

12. The computer-readable storage medium of claim 11, wherein the candidate calibration model is one of a plurality of candidate calibration models, and wherein the operations comprise:
for each respective candidate calibration model: determining, using the one or more quantum device models and based on the log data, a respective simulated quantum device performance metric associated with implementation of the respective candidate calibration model; and
determining a selected calibration model based on a comparison of the plurality of candidate calibration models.

13. The computer-readable storage medium of claim 12, wherein the operations comprise:
calibrating the quantum device using the selected calibration model.

14. The computer-readable storage medium of claim 11, wherein the operations comprise:
determining, using the candidate calibration model, an input to the one or more quantum device models.

15. The computer-readable storage medium of claim 14, wherein the input is associated with a change to the operating characteristic of the qubit according to the candidate calibration model.

16. The computer-readable storage medium of claim 14, wherein the input is an updated operating characteristic of the qubit as calibrated according to the candidate calibration model.

17. The computer-readable storage medium of claim 11, wherein the one or more quantum device models comprise a machine-learned model trained to map the qubit operating characteristics to the associated observed quantum device performance metrics.

18. The computer-readable storage medium of claim 11, wherein the one or more quantum device models comprise a model configured to simulate one or more compute operations of the quantum device.

19. A quantum computing system comprising:
a superconducting qubit of a quantum device;
a calibration system comprising one or more processors and a computer-readable storage medium storing a selected calibration model and instructions that are executable to cause the calibration system to calibrate the quantum device using the selected calibration model;

wherein the selected calibration model was selected by:
obtaining a plurality of candidate calibration models for calibrating an operating characteristic of the qubit;
for each respective candidate calibration model:
determining, using the respective candidate calibration model, an input to one or more quantum device models;
determining, using the one or more quantum device models and based on log data, a respective simulated quantum device performance metric associated with implementation of the respective candidate calibration model based on the input; and
determining the selected calibration model based on a comparison of the plurality of candidate calibration models.

20. The quantum computing system of claim 19, wherein:
the log data is descriptive of observed qubit operating characteristics and associated observed quantum device performance metrics; and
the one or more quantum device models comprise a machine-learned model trained to map the qubit operating characteristics to the associated observed quantum device performance metrics.

* * * * *